Nov. 1, 1966 W. L. PRESCOTT 3,282,145
SCREW SOCKET HAVING TANGENTIAL KEYWAYS
Filed March 19, 1965
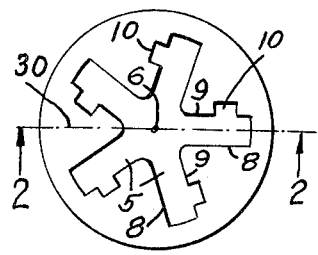
FIG. 1.
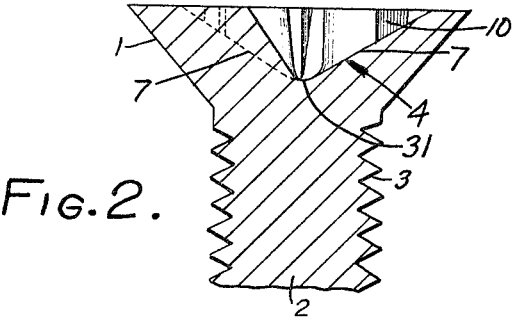
FIG. 2.
FIG. 4.
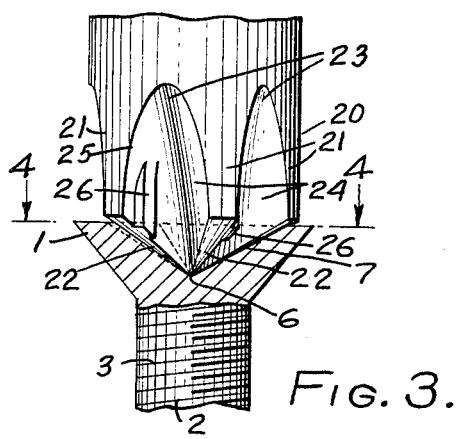
FIG. 3.
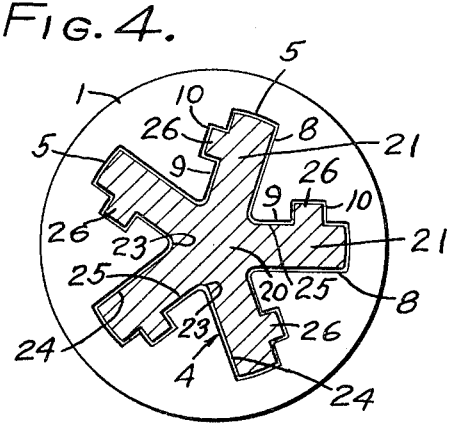
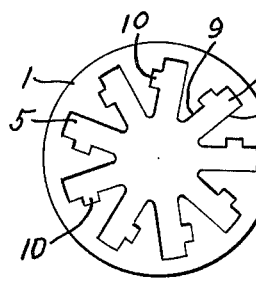
FIG. 7.
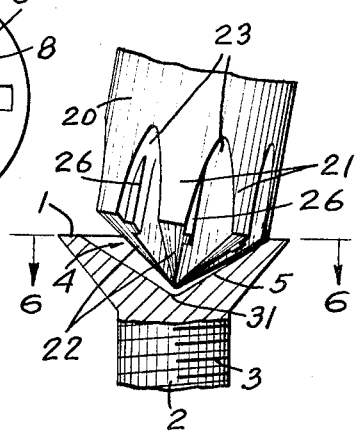
FIG. 5.
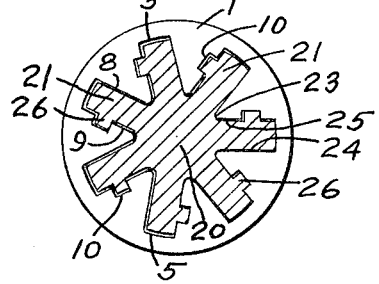
FIG. 6.
INVENTOR,
WILMAR L. PRESCOTT,
BY
*J. Calvin Brown*,
ATTORNEY

United States Patent Office 3,282,145
Patented Nov. 1, 1966

3,282,145
SCREW SOCKET HAVING TANGENTIAL KEYWAYS
Wilmar L. Prescott, 5361 Russell Ave., Hollywood, Calif.
Filed Mar. 19, 1965, Ser. No. 441,184
1 Claim. (Cl. 85—45)

The present invention relates to improvements in screw construction of the socket head type. The screw of the present invention is adaptable for any type of screw such as cap, set, coach, flat head, and drive, to name but a few.

An object of the invention is to provide a socket headed screw which has a large bearing area for strength.

A further object is to provide a socket headed screw which provides at least two internal bearing corners on a 180° half of the socket.

A further object is the provision of a socket headed screw of a type which is provided with radial grooves so arranged that if the screw driver for said screw is tilted in plane of one groove, two bearing corners in the socket take one-half of the torque load in the other 180° half of the socket.

A further object is the provision of a socket headed screw wherein the bit end of a screw driver under high torque loading does not tend to rise in the socket or to cam therefrom if the screw driver is tilted.

A further object is the provision of a socket headed screw which will cam a screw driver to a vertical position if the screw driver is tilted from vertical to the end that the screw driver is maintained seated in the screw socket.

In the drawing:

FIGURE 1 is a top plan view of a flat headed machine screw incorporating the invention;

FIGURE 2 is a fragmentary sectional view on the line 2—2 of FIGURE 1, and on an enlarged scale;

FIGURE 3 is a fragmentary, partially sectional view of a screw driver within the socket of the screw;

FIGURE 4 is a sectional view, on an enlarged scale, taken on the line 4—4 of FIGURE 3;

FIGURE 5 is a fragmentary sectional view of a further form of socket headed screw showing the bit of a screw driver within the socket of said screw;

FIGURE 6 is a sectional view, on an enlarged scale, on the line 6—6 of FIGURE 5; and, FIGURE 7 is a further modification of the socket head of a screw.

Referring now to the drawing, the screw shown in FIGURES 1 to 4 inclusive includes a head 1 and a shank 2, which is provided with screw threads 3. The head 1 is of the flat type, in the present instance, and said head is provided with a socket designated generally as 4 for the reception of the driving or bit end of a screw driver. In the present embodiment shown, the socket comprises five intersecting radial grooves or flutes each groove designated as 5, and in which the radial center 6 lies on the axis of the shank 2. Each radial groove 5 is provided with a bottom wall 7 which tapers downwardly from the outer face of the screw head to the apex 6 of the slot, with side walls 8 and 9 which are substantially vertical and parallel, the side walls increasing in height from the outer face or top surface of the head to approximately the apex 6 of the socket. This construction does not appreciably reduce metal thickness of the head and lends strength to the screw head. In the present instance the side vertical wall 9 of each groove 5 is provided with a vertical tangential keyway or groove 10 which extends from the top surface of the screw head inwardly to the inclined bottom wall 7. As shown, in FIGURES 1 and 4, the intersecting radial grooves 5 are symmetrically spaced apart. In my invention I have found it advantageous to provide a screw head, the socket of which is made up of radial grooves of which there may be odd numbers such as 5 to 9 thereof, as shown in the several figures.

The bit end of the screw driver is constructed to conform or be complimentary to the socket construction of the screw head and referring to FIGURES 3 and 4, the screw driver bit end 20 is provided with five equidistantly spaced apart and radial wings designated generally as 21, with the end face 22 of the screw driver bit wings tapered to conform to the taper of the bottom walls 7 of the radial grooves 5. Thus, the screw driver is provided in the present embodiment with five symmetrically spaced flutes designated generally as 23 extending inwardly from the tapered end 22 to provide the wings 21. The wings 21 are formed to provide substantially parallel vertical side wall portions at 24 and 25 for bearing engagement between the vertical tangential side walls 8 and 9 of each groove 5. A vertical key 26 extends from one of the vertical side walls of each wing for reception in a keyway 10.

In FIGURE 6 I have provided a screw head with an odd number of radial grooves and in this instance seven. In FIGURE 7 I have provided a screw head with a socket comprising nine radial grooves. However, the general construction for the heads of FIGURES 6 and 7 follows that of FIGURE 1. The screw driver shown in FIGURE 5 conforms to the particular socket in the head of a screw and in this respect would conform to either the seven or nine radial groove type of socket.

The operation, uses and advantages of my invention are as follows.

I have selected an odd number of radial grooves for the socket headed screw as I have found that five to nine radial grooves have proved efficient in operation and use. Neglecting for the moment the provision of the keyways 10, if a conforming screw driver bit is inserted within socket 4, the wings 21 of the screw driver bit will be received within the radial grooves 5 in the position as shown in FIGURE 3. If the screw driver shank is tilted, as shown in FIGURE 5, at least two of the wings 21 will be within two of the radial grooves, assuming five radial groves. Any tendency of the screw driver bit to cam from the screw socket is therefore minimized. A vertical plane passed radially through one radial groove will bisect the angle of intersecting radial grooves, as indicated by the dotted line 30 in FIGURE 1, the dotted line representing the vertical plane. Thus, a tilting of the screw driver bit will not cause appreciable camming action of said screw driver from the socket but will have the tendency to straighten the screw driver to a vertical position within the socket.

The use of the vertical keyways in a vertical wall of each radial groove and a conforming right angle key on a wing of the screw driver bit aids in locking the screw driver bit within the socket and in the maintaining of the screw driver in a substantially vertical position within the socket. The side walls of the intersecting radial grooves provide a sharp edge at the zone of intersection and preferably I round this edge as shown in the figures at 31 so that the screw driver does not require sharp edges in the fluted portions thereof. It is a known fact that the screw driver bit tends to cam itself or rise within the socket under high torque. However, this tendency to rise or cam is prevented for the reason that no radial groove is in diametric alignment with another radial groove due to the odd number of grooves and further because of the keyways and key construction for the screw driver bit and the socket head of the screw. My construction lends itself to a shallow type with the result that the screw head has great strength under torque conditions. The vertical sides of each groove afford a large area against which a turning force is exerted by a screw driver.

It is evident that in certain socket headed screw constructions I may use an odd number of grooves of the type depicted in the drawing without use of the keyways for the reason that no one radial groove is in alignment with an oppositely disposed radial groove and, therefore, camming action of the screw driver bit is effectively minimized. However, in such screw socket constructions as incorporate in addition to radial grooves, the keyways 10, the groove construction for the screw socket may vary as to the number thereof, such as two or more as the keys and keyways effectively hold a screw driver bit in position within the screw socket. When both the odd number of grooves are utilized in a socket headed screw such as five to nine, together with the keyways, a screw results which may be turned by automatic machinery without fear of the bit end of a screw driver camming from or lifting out of the screw socket under high torque.

I claim:

In a screw having a threaded shank and a head, the head formed with a socket having a plurality of symmetrically arranged equally spaced radial grooves, no two grooves of which are in diametrical alignment, the center for which is co-axial with the screw shank, each groove provided with parallel vertical side walls and a bottom wall sloping downwardly from the head of the screw to the center thereof, and one slot opening into the screw head from one of said side walls of each groove to define a keyway at right angles to the vertical side wall and extending substantially parallel to the axis of the shank, the side wall of each groove containing said slot corresponding to that in each of the other grooves, the radial grooves and the keyways adapted to receive a conforming bit of a screw driver.

References Cited by the Examiner
UNITED STATES PATENTS

| | | | |
|---|---|---|---|
| 2,173,707 | 9/1939 | Brown | 85—45 |
| 3,122,963 | 3/1964 | Borgeson | 85—45 |

R. S. BRITTS, *Assistant Examiner.*

THOMAS F. CALLAGHAN, *Primary Examiner.*